(12) United States Patent
Kelley

(10) Patent No.: US 6,264,361 B1
(45) Date of Patent: Jul. 24, 2001

(54) DRUM INSULATING DEVICE FOR A CONCRETE TRUCK

(76) Inventor: David B. Kelley, 8650 W. Peoria Ave., Unit 1070, Peoria, AZ (US) 85345

( * ) Notice: Subject to any disclaimer, the term of this patent is extended or adjusted under 35 U.S.C. 154(b) by 0 days.

(21) Appl. No.: 09/602,114

(22) Filed: Jun. 23, 2000

(51) Int. Cl.[7] .............................. B65D 85/68; B01F 15/00
(52) U.S. Cl. ........................... 366/349; 366/347; 366/54; 150/901; 150/166
(58) Field of Search ..................................... 366/349, 348, 366/53, 54, 347; 150/901, 166; 280/770; 296/136; 428/99

(56) References Cited

U.S. PATENT DOCUMENTS

| | | |
|---|---|---|
| D. 393,572 | 4/1998 | Melk . |
| 2,311,514 * | 2/1943 | Bramblett . |
| 2,366,600 * | 1/1945 | Daniel . |
| 2,705,208 * | 3/1955 | Schweikert . |
| 3,906,129 * | 9/1975 | Damois . |
| 4,000,826 * | 1/1977 | Rogers . |
| 4,039,098 * | 8/1977 | Stilts . |
| 4,122,640 | 10/1978 | Commins et al. . |
| 4,206,575 * | 6/1980 | Leonard . |
| 4,244,411 * | 1/1981 | Kristrom et al. . |
| 5,263,603 | 11/1993 | Mcbride . |
| 5,516,181 | 5/1996 | Thompson . |
| 5,575,402 | 11/1996 | Botsolas . |
| 5,609,265 * | 3/1997 | Haberkorn et al. . |
| 5,657,594 | 8/1997 | Morita et al. . |

* cited by examiner

Primary Examiner—Tony G. Soohoo

(57) ABSTRACT

A drum insulating device for a concrete truck for insulating ready mix concrete trucks. The drum insulating device for a concrete truck includes a sheet of material having a pair of outer layers and an inner layer and further having a first portion and a second portion and being adapted to be securely fastened about a mixing drum of a concrete truck with fasteners; and also includes fastening members for fastening the first and second portions together.

11 Claims, 2 Drawing Sheets

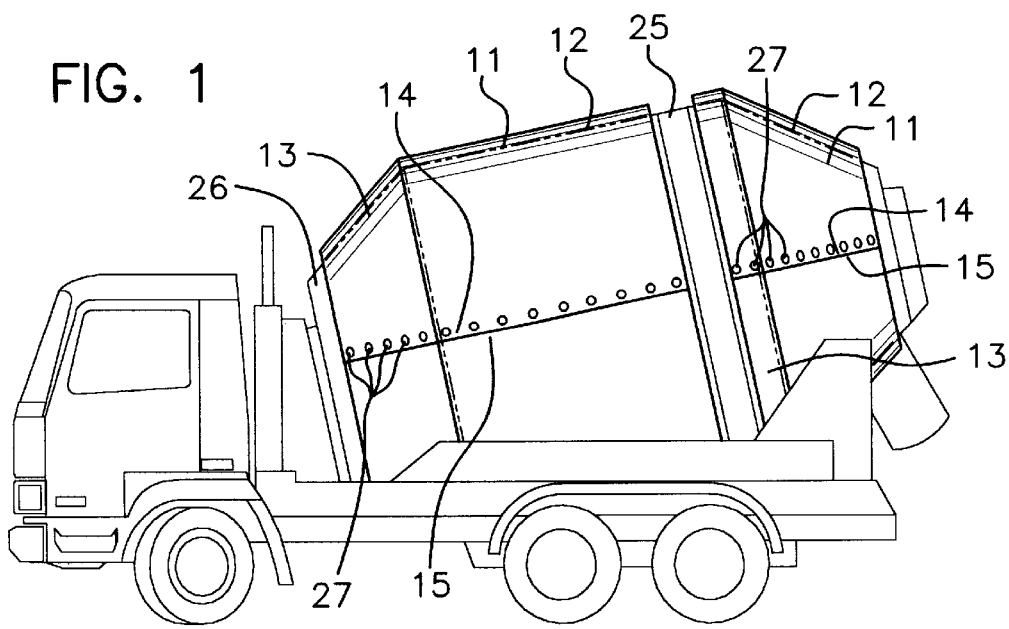

DRUM INSULATING DEVICE FOR A CONCRETE TRUCK

BACKGROUND OF THE INVENTION

1. Field of the Invention

The present invention relates to a drum wrap for a concrete mixer and more particularly pertains to a new drum insulating device for a concrete truck for insulating ready mix concrete trucks.

2. Description of the Prior Art

The use of a drum wrap for a concrete mixer is known in the prior art. More specifically, a drum wrap for a concrete mixer heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,657,594; 4,122,640; 5,263,603; 5,575,402; 5,516,181; and Des. 393,572.

While these devices fulfill their respective, particular objectives and requirements, the aforementioned patents do not disclose a new drum insulating device for a concrete truck. The inventive device includes a sheet of material having a pair of outer layers and an inner layer and further having a first portion and a second portion and being adapted to be securely fastened about a mixing drum of a concrete truck with fasteners; and also includes fastening members for fastening the first and second portions together.

In these respects, the drum insulating device for a concrete truck according to the present invention substantially departs from the conventional concepts and designs of the prior art, and in so doing provides an apparatus primarily developed for the purpose of insulating ready mix concrete trucks.

SUMMARY OF THE INVENTION

In view of the foregoing disadvantages inherent in the known types of drum wrap for a concrete mixer now present in the prior art, the present invention provides a new drum insulating device for a concrete truck construction wherein the same can be utilized for insulating ready mix concrete trucks.

The general purpose of the present invention, which will be described subsequently in greater detail, is to provide a new drum insulating device for a concrete truck which has many of the advantages of the drum wrap for a concrete mixer mentioned heretofore and many novel features that result in a new drum insulating device for a concrete truck which is not anticipated, rendered obvious, suggested, or even implied by any of the prior art drum wrap for a concrete mixer, either alone or in any combination thereof.

To attain this, the present invention generally comprises a sheet of material having a pair of outer layers and an inner layer and further having a first portion and a second portion and being adapted to be securely fastened about a mixing drum of a concrete truck with fasteners; and also includes fastening members for fastening the first and second portions together.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new drum insulating device for a concrete truck which has many of the advantages of the drum wrap for a concrete mixer mentioned heretofore and many novel features that result in a new drum insulating device for a concrete truck which is not anticipated, rendered obvious, suggested, or even implied by any of the prior art drum wrap for a concrete mixer, either alone or in any combination thereof.

It is another object of the present invention to provide a new drum insulating device for a concrete truck which may be easily and efficiently manufactured and marketed.

It is a further object of the present invention to provide a new drum insulating device for a concrete truck which is of a durable and reliable construction.

An even further object of the present invention is to provide a new drum insulating device for a concrete truck which is susceptible of a low cost of manufacture with regard to both materials and labor, and which accordingly is then susceptible of low prices of sale to the consuming public, thereby making such drum insulating device for a concrete truck economically available to the buying public.

Still yet another object of the present invention is to provide a new drum insulating device for a concrete truck which provides in the apparatuses and methods of the prior art some of the advantages thereof, while simultaneously overcoming some of the disadvantages normally associated therewith.

Still another object of the present invention is to provide a new drum insulating device for a concrete truck for insulating ready mix concrete trucks.

Yet another object of the present invention is to provide a new drum insulating device for a concrete truck which includes a sheet of material having a pair of outer layers and an inner layer and further having a first portion and a second portion and being adapted to be securely fastened about a mixing drum of a concrete truck with fasteners; and also includes fastening members for fastening the first and second portions together.

Still yet another object of the present invention is to provide a new drum insulating device for a concrete truck that effectively extends the life of the mixture contained in the mixing drum.

Even still another object of the present invention is to provide a new drum insulating device for a concrete truck that is easy and convenient to wrap about and fasten to the mixing drum of a ready mix concrete truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a new drum insulating device for a concrete truck according to the present invention shown being fastened about the mixing drum.

FIG. 2 is a side elevational view of the present invention.

DESCRIPTION OF THE PREFERRED EMBODIMENT

Figure 3:
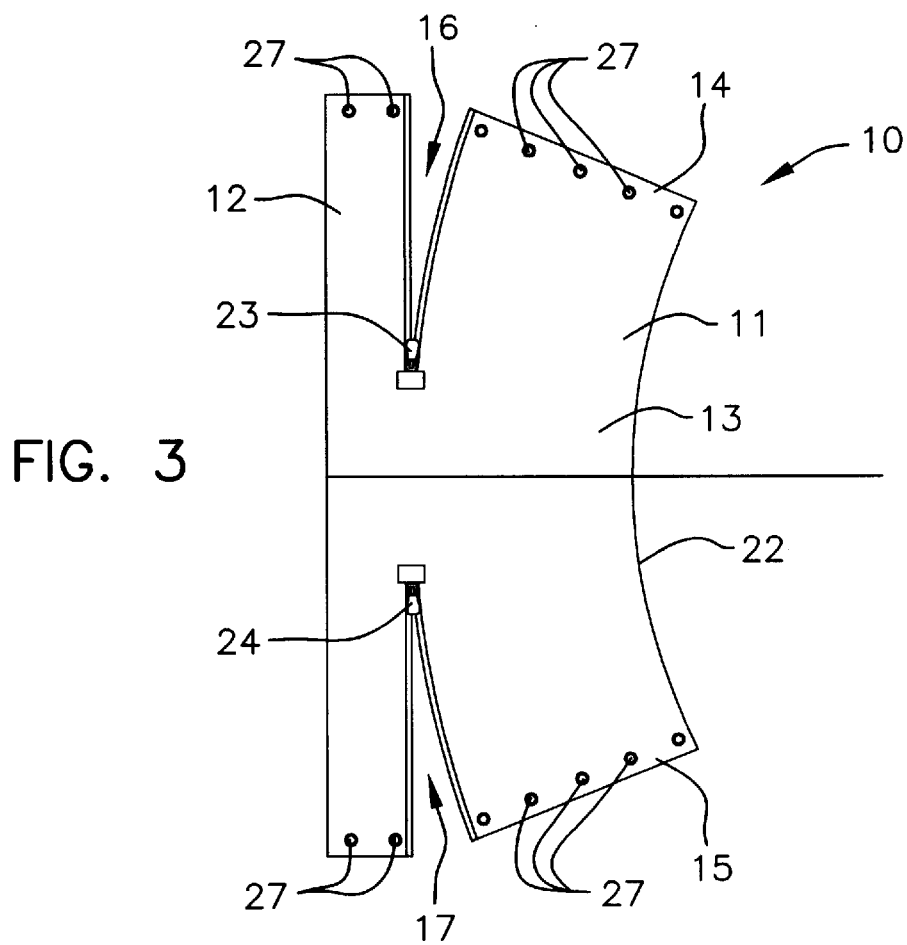
FIG. 3 is another side elevational view of the present invention.
Figure 4:
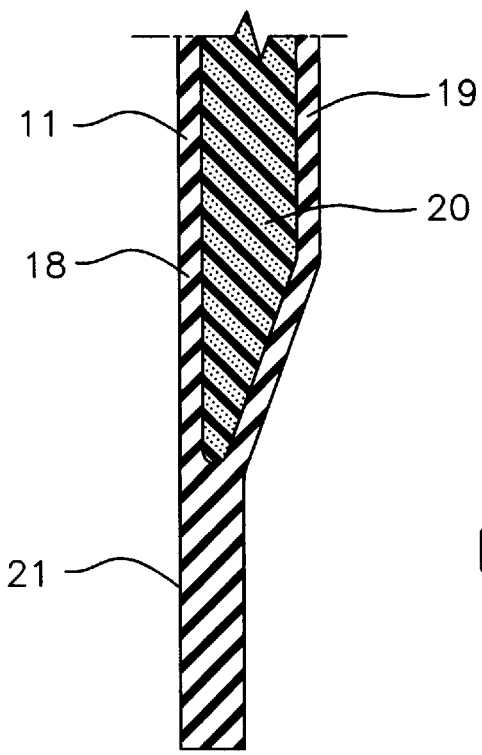
FIG. 4 is a partial cross-sectional view of the present invention.

With reference now to the drawings, and in particular to FIGS. 1 through 4 thereof, a new drum insulating device for a concrete truck embodying the principles and concepts of the present invention and generally designated by the reference numeral 10 will be described.

As best illustrated in FIGS. 1 through 4, the drum insulating device for a concrete truck 10 generally comprises sheets of material 11 each having a pair of outer layers 18,19 and an inner layer 20 and further having a first portion 12 and a second portion 13 and being adapted to be securely fastened about a mixing drum 25 of a concrete truck 26 with fasteners. Each sheet of material further includes side edges 14,15 and splits 16,17 extending through the side edges 14,15 with each of the splits 16,17 extending inwardly of the respective sheet of material 11 and being generally in alignment with one another. The splits 16,17 are spaced apart and generally separate the respective sheet of material 11 into the first and second portions 12,13. The first and second portions 12,13 are integrally connected to one another between the splits 16,17 with the second portion 13 being essentially tapered and having an end edge 22 which is essentially bowed inwardly of the respective sheet of material 11. Each sheet of material 11 also includes a plurality of holes 27 being spaced apart and extending long the side edges 14,15 thereof and extending through the sheet of material 11 and being adapted to receive the fasteners for fastening the side edges 14,15 to one another about the mixing drum 25 of the concrete truck 26. The outer layers 18,19 of the sheets of material 11 are essentially made of rubber, and the inner layer 20 of the sheets of material are essentially made of foam rubber with each sheet of material having a perimeter portion 21 which is essentially one layer of rubber. The drum insulating device 10 also includes fastening members 23,24 for fastening the first and second portions 12,13 of the sheets of material 11 together with the fastening members 23,24 securely and conventionally extending along edges of the splits 16,17 and with the fastening members 23,24 being essentially zippers.

In use, the user wraps the sheets of material 11 about the mixing drum 25 with the first and second portions 12,13 being appropriately positioned along the mixing drum 25, and then fastens the side edges 14,15 together using the fasteners, and then zips the splits 16,17 closed using the fastening members 23,24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A drum insulating device for a concrete truck comprising:

sheets of material each having a pair of outer layers and an inner layer and further each having a first portion and a second portion and being adapted to be securely fastened about a mixing drum of a concrete truck with fasteners; and fastening members for fastening said first and second portions together.

2. A drum insulating device for a concrete truck as described in claim 1, wherein each said sheet of material further includes side edges and splits extending through said side edges, each of said splits extending inwardly of a respective said sheet of material and being generally in alignment with one another.

3. A drum insulating device for a concrete truck as described in claim 2, wherein said splits are spaced apart and generally separates a respective said sheet of material into said first and second portions.

4. A drum insulating device for a concrete truck as described in claim 3, wherein said first and second portions are integrally connected to one another between said splits.

5. A drum insulating device for a concrete truck as described in claim 4, wherein said second portion is essentially tapered and has an end edge which is essentially bowed inwardly of a respective said sheet of material.

6. A drum insulating device for a concrete truck as described in claim 5, wherein each said sheet of material includes a plurality of holes being spaced apart and extending along said side edges thereof and being adapted to receive the fasteners for fastening said side edges to one another about the mixing drum of the concrete truck.

7. A drum insulating device for a concrete truck as described in claim 6, wherein said fastening members securely extend along edges of said splits.

8. A drum insulating device for a concrete truck as described in claim 7, wherein said outer layers of said sheets of material is essentially made of rubber, and said inner layer of said sheets of material is essentially made of foam rubber.

9. A drum insulating device for a concrete truck as described in claim 8, wherein each said sheet of material has a perimeter portion which is essentially one layer of said rubber.

10. A drum insulating device for a concrete truck as described in claim 9, wherein said fastening members are essentially zippers.

11. A drum insulating device for a concrete truck comprising:

sheets of material each having a pair of outer layers and an inner layer and further each having a first portion and a second portion and being adapted to be securely fastened about a mixing drum of a concrete truck with fasteners, each said sheet of material further including side edges and splits extending through said side edges, each of said splits extending inwardly of a respective said sheet of material and being generally in alignment with one another said splits being spaced apart and generally separating a respective said sheet of material into said first and second portions, said first and second portions being integrally connected to one another between said splits, said second portion being essentially tapered and having an end edge which is essentially bowed inwardly of a respective said sheet of material, each said sheet of material including a plurality of holes being spaced apart and extending along said side edges thereof and extending through said sheet of material and being adapted to receive the fasteners for fastening said side edges to one another about the mixing drum of the concrete truck, said outer layers of said sheets of material being essentially made of rubber, and said inner layer of said sheet of materials being essentially made of foam rubber, each said sheet of material having a perimeter portion which is essentially one layer of said rubber; and fastening members for fastening said first and second portions together, said fastening members securely extending along edges of said splits, said fastening members being essentially zippers.

* * * * *